(No Model.)
E. G. PASSMORE.
LAWN MOWER.
No. 374,808. Patented Dec. 13, 1887.
FIG.1.
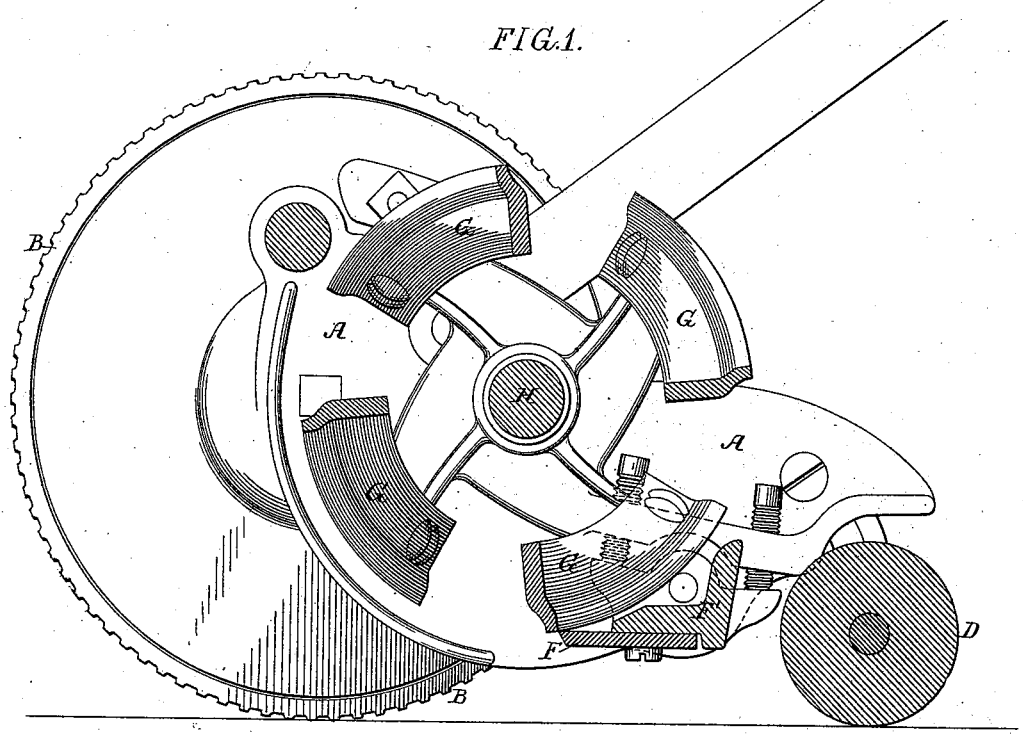
FIG.2.
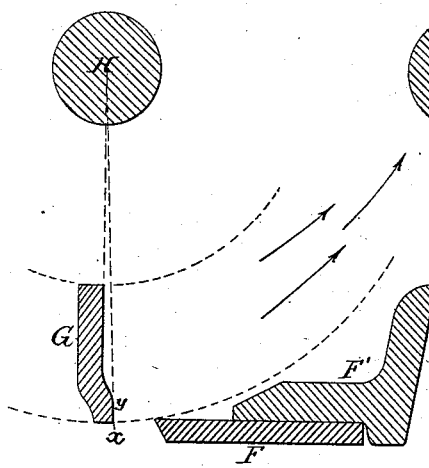
FIG.3.
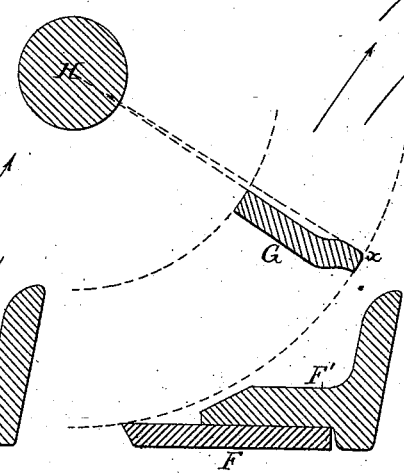
FIG.4.
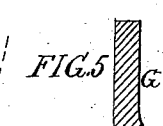
FIG.5.
FIG.6.
FIG.7.
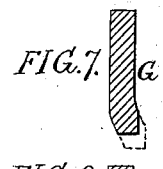
FIG.8.
Witnesses:
Alex Barkoff
William D. Conner
Inventor:
Everett G. Passmore
by his Attorneys
Howson and Son

UNITED STATES PATENT OFFICE.

EVERETT G. PASSMORE, OF HAVERFORD COLLEGE, PENNSYLVANIA.

LAWN-MOWER.

SPECIFICATION forming part of Letters Patent No. 374,808, dated December 13, 1887.

Application filed October 29, 1886. Serial No. 217,529. (No model.)

*To all whom it may concern:*

Be it known that I, EVERETT G. PASSMORE, a citizen of the United States, residing at Haverford College, Montgomery county, Pennsylvania, have invented certain Improvements in Lawn-Mowers, of which the following is a specification.

One object of my invention is to so construct the blades for the rotary cutter of a lawn-mower as to provide for the ready sharpening of said blades without the exercise of any special skill or the employment of any special machinery, further objects being to lighten the blade and to insure the proper discharge of the cut grass rearwardly from the machine.

In the accompanying drawings, Figure 1 is a longitudinal section of a lawn-mower, the rotary cutter of which is provided with blades constructed in accordance with my invention. Figs. 2 and 3 are diagrams illustrating features of the invention, and Figs. 4 to 8, inclusive, are diagrams illustrating progressive reductions of the blade of the rotary cutter, due to wear and sharpening of said blade.

In Fig. 1, A represents part of the frame of the machine; B, the traction driving-wheel; D, the rear supporting-roller; F, the fixed cutting-blade, carried by an adjustable bar, F', and G the blades of the rotary cutter, the latter being hung to the shaft H and being driven by suitable gearing from the traction-wheel, as usual.

If the blades G are inclined forward from a radial line drawn from the axis of the rotary cutter, they have a tendency to mash or jam the grass against the fixed blade, instead of properly cutting it; hence said blades G have been heretofore arranged either with their front faces on a radial line or inclined rearwardly from such radial line.

In the operation of the machine the blades G become worn at the front outer corner, $x$, this corner eventually becoming rounded, as shown in Fig. 3, so as to render the machine inoperative.

If a flat-faced radial blade is used, one of two methods must then be resorted to in order to sharpen the blade, the first method being to grind off the entire front face of the blade until the rounded corner has been removed, and the other plan being to grind or file the periphery of the blade until a like result is effected. The first of these plans is objectionable, because it cannot be resorted to by the user of the implement or by a mechanic not specially skilled or having special tools, and, furthermore, because each sharpening operation reduces the thickness of the blade, the second plan being also one requiring the exercise of great skill and care in order that the blade may be reduced uniformly throughout its entire length, so as to retain its truth in respect to the cutting-face of the fixed blade of the machine.

If the blade is inclined rearwardly from a radial line, sharpening of the same can be effected by grinding or filing off the front corner; but this reduces the thickness of the blade at the cutting-edges, and is therefore objectionable; but the main objection to a blade of this character is that, owing to the inclination of the blade, the outer portion of said blade, as it is carried upward after having cut the grass, is higher than the inner portion of the blade, and prevents the proper delivery of the cut grass, the elevated outer portion of the blade catching the grass and throwing it upward and forward, instead of upward and rearward, as it should be thrown.

In order to overcome the objections noted, I make a blade having its forward face in two planes, that nearest the outer portion of the blade being in advance of the other and the two planes being parallel, or thereabout. The blade is thus provided on its front face with a projecting portion, $y$, of contracted area, which is susceptible of reduction by a file when it becomes necessary to sharpen the blade; this operation being one which can be readily performed by the user of the machine or any one familiar with the use of the file, as it requires no special skill or care, the peripheral surface of the blade not being touched, but retaining the truth originally given to it and preserved by the joint action of the moving and fixed blades in the operation of the machine, for it should be understood that although this peripheral face is being constantly worn away, the wear is uniform from end to end of the blade, so that the general truth of the latter is not impaired.

The two planes forming the front face of the blade G are preferably connected by a portion having a gentle curve, and the rear face of the blade follows the line of the front face, so that the same width of peripheral face of the blade is preserved through all of the progressive stages of sharpening and wear, as shown in Figs. 4 to 8.

The blade has in effect at the outer edge a forward bend or corrugation, and I find that this serves, in addition to the advantages above enumerated, to impart such stiffness to the blade that the latter can be made lighter than usual, and will not lose the curved and twisted shape imparted to it by dies, and necessary in order to insure the proper operation of the blade when applied to the arms of the rotary cutter.

The blade is preferably so secured to the arms of the cutter that the planes forming the front face of the blade are substantially in a radial line from the axis of the cutter, as shown in Figs. 2 and 3, so that the cut grass will be discharged upwardly and rearwardly, as indicated by the arrows in said figures.

I claim as my invention—

1. The within-described longitudinal blade for the rotary cutter of a lawn-mower, said blade consisting of a bar having its front face in two substantially parallel planes, that nearest the outer edge of the blade being in advance of the other, all substantially as specified.

2. The within-described longitudinal blade for the rotary cutter of a lawn-mower, said blade consisting of a bar having its front face in two planes, that nearest the outer edge being in advance of the other, and a rear face shaped as described, whereby a uniform width of peripheral face on the blade is preserved throughout the successive reductions of the face of the blade, due to the sharpening operations, all substantially as specified.

3. The combination of the rotary cutter of a lawn-mower with longitudinal blades, each consisting of a bar having a front face in two planes substantially in a radial line from the axis of the cutter, as set forth.

In testimony whereof I have signed my name to this specification in the presence of two subscribing witnesses.

EVERETT G. PASSMORE.

Witnesses:
WILLIAM D. CONNER,
HARRY SMITH.